United States Patent [19]

Harms et al.

[11] 4,325,705
[45] Apr. 20, 1982

[54] ANTHRAQUINONE REACTIVE DYESTUFFS

[75] Inventors: Wolfgang Harms; Klaus Wunderlish, both of Leverkusen; Klaus von Oertzen, Cologne, all of Fed. Rep. of Germany

[73] Assignee: Bayer Aktiengesellschaft, Leverkusen, Fed. Rep. of Germany

[21] Appl. No.: 101,614

[22] Filed: Dec. 10, 1979

[30] Foreign Application Priority Data

Dec. 16, 1978 [DE] Fed. Rep. of Germany ....... 2854482

[51] Int. Cl.³ ..................... C09B 1/34; C07D 251/38; C07C 143/665
[52] U.S. Cl. ........................................ 8/676; 260/274; 544/189; 8/677; 8/679
[58] Field of Search ..................... 260/374; 544/189; 8/676, 677, 679

[56] References Cited

U.S. PATENT DOCUMENTS

| | | | |
|---|---|---|---|
| 2,773,871 | 12/1956 | Brassel et al. | 260/374 |
| 2,889,323 | 6/1959 | Heslop | 260/374 |
| 3,073,824 | 1/1963 | Ganst et al. | 260/374 |
| 3,558,621 | 1/1971 | Bienet et al. | 544/189 |
| 3,974,160 | 8/1976 | Seiler et al. | 544/187 |

FOREIGN PATENT DOCUMENTS

| | | |
|---|---|---|
| 2839429 | 3/1979 | Fed. Rep. of Germany . |
| 832400 | 4/1960 | United Kingdom ................ 544/189 |
| 1170195 | 11/1969 | United Kingdom . |
| 1551584 | 8/1979 | United Kingdom . |

Primary Examiner—Winston A. Douglas
Assistant Examiner—Raymond Covington
Attorney, Agent, or Firm—Sprung, Felfe, Horn, Lynch & Kramer

[57] ABSTRACT

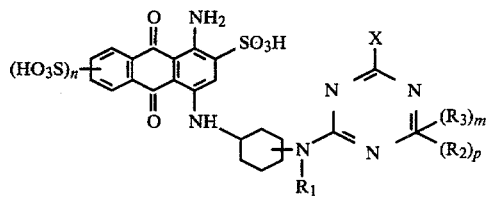

wherein n, m, p, X, $R_1$, $R_2$ and $R_3$ have the meaning indicated in the description, and their use for dyeing and printing materials containing hydroxyl groups or containing amide groups, such as textile fibres, filaments and fabrics made of wool, silk and synthetic polyamide fibres and polyurethane fibres and for the wash-fast dyeing and printing of natural or regenerated cellulose.

6 Claims, No Drawings

ANTHRAQUINONE REACTIVE DYESTUFFS

The present invention relates to reactive dyestuffs of the formula

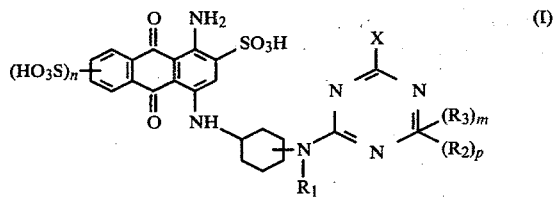

wherein
n is 0 or 1,
m and p are 0 or 1 and m+p=1,

X is Cl or Br,
$R_1$ is H or a substituent,
$R_2$ is $NH_2$ or alkylamino, dialkylamino or aralkylamino containing at least one group conferring solubility in water and
$R_3$ is the same as $R_2$ or is arylamino, and when n is 0, p is 1 and when n is 1, m is 1.

The alkyl, aralkyl, and aryl radicals can optionally contain further substituents.

Suitable radicals $R_1$ are, in addition to H, in particular $C_1$-$C_4$-alkyl, such as $CH_3$, $C_2H_5$, $C_3H_7$ and $C_4H_9$, $CH_2$—$CH_2$—OH, $CH_2$—$CH_2$—$OSO_3H$, $CH_2$—$CH_2$—COOH, $CH_2$—COOH and $CH_2$—$CH_2$—$SO_3H$.

Suitable groups which confer solubility in water are, in particular $SO_3H$, $OSO_3H$ and COOH.

Suitable radicals $R_2$ are, in addition to $NH_2$, NH—$CH_2$—$SO_3H$, NH—$CH_2$—$CH_2$—$SO_3H$, NH—$CH_2$—$CH_2$—$OSO_3H$, NH—$CH_2$—$CH(OSO_3H)$—$CH_2$—Cl, $N(CH_3)$—$CH_2$—$SO_3H$, $N(CH_3)$—$CH_2$—$CH_2$—$SO_3H$, $N(CH_3)$—$CH_2$—$CH_2$—$OSO_3H$, $N(CH_2$—$CH_2$—$OSO_3H)_2$, $N(CH_2$—$CH_2$—$SO_3H)_2$, NH—$CH_2$—COOH, $N(CH_3)$—$CH_2$—COOH, $N(CH_2$—$COOH)_2$, 2-, 3- or 4-sulphobenzylamino, 2-(2'-, 3'- or 4'-sulphophenyl)-ethylamino and N-methyl-N-(2-, 3- or 4-sulphobenzyl)-amino.

Suitable radicals $R_3$ are, for example, arylamino groups, such as phenylamino, 2-, 3- or 4-sulphophenylamino, 2,4-, 2,5-, 3,5- or 3,4-disulphophenylamino, 2-, 3- or 4-carboxyphenylamino, 2-carboxy-4- or -5-sulphophenylamino, 3-carboxy-5-sulphophenylamino, 2-methyl-4,5-disulphophenylamino, 4-methyl-2- or -3-sulphophenylamino, 2-methyl-4- or -5-sulphophenylamino, 2,6-dimethyl-3- or -4-sulphophenylamino, 2,4-dimethyl-6-sulphophenylamino, 2-chloro-4- or -5-sulphophenylamino, 3-chloro-2-methyl-6-sulphophenylamino, 4-methoxy-2- or -3-sulphophenylamino, 2-methoxy-5-sulphophenylamino, 2-(β-hydroxyethoxy)-5-sulphophenylamino, 4-(β-hydroxyethoxy)-2- or -3-sulphophenylamino, 4-sulphomethylphenylamino, 2-, 3- or 4-methylphenylamino, 2-, 3- or 4-chlorophenylamino, 2-, 3- or 4-methoxyphenylamino, 3- or 4-nitrophenylamino, 2-, 3- or 4-acetylaminophenylamino, 4-N-methyl-N-acetyl-phenylamino, N-methylphenylamino, N-methyl-2-methyl-5-sulphophenylamino, N-methyl-3-sulphophenylamino, N-(β-hydroxyethyl)-phenylamino, N-ethylphenylamino, N-β-sulphoethyl-phenylamino, 1-, 3-, 4-, 5-, 6-, 7- or 8-sulpho-2-naphthylamino, 2-, 3-, 4-, 5-, 6-, 7- or 8-sulpho-1-naphthylamino, 1,5-, 2,6-, 4,8-, 5,7- or 6,8-disulpho-2-naphthylamino, 2,4-, 3,7-, 3,8-, 4,8-, 5,7- or 6,8-disulpho-1-naphthylamino, 1,5,7- or 3,6,8-trisulpho-2-naphthylamino and 3,5,7- or 3,6,8-trisulpho-1-naphthylamino.

Preferred dyestuffs within the scope of the formula (I) are those of the formula

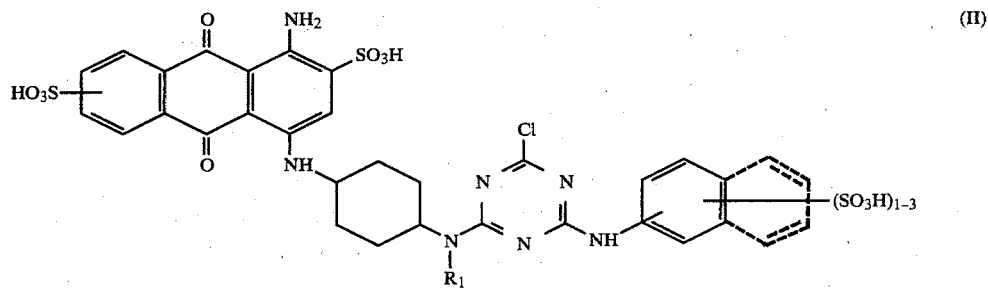

wherein $R_1$ has the meaning indicated above.

The new dyestuffs are obtained by subjecting aminocyclohexylamino compounds of the formula

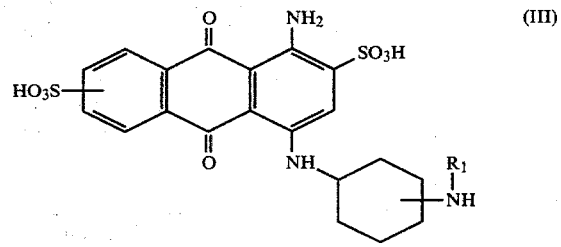

wherein $R_1$ has the abovementioned meaning, to a condensation reaction with 2,4-dihalogenotriazinyl compounds of the formula

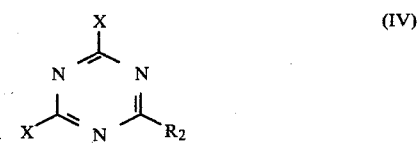

which are substituted in the 6-position and wherein X and $R_2$ have the meaning indicated above, or by first reacting aminocyclohexylamino compounds of the formula (III) with cyanuric chloride or cyanuric bromide to give compounds of the formula

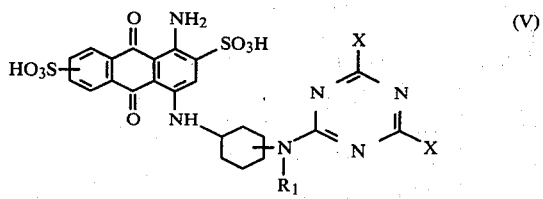

and then subjecting these compounds to a condensation reaction with compounds of the formula

H-R₂      (VI)

which contain active hydrogen and wherein $R_2$ has the meaning indicated above, HX being eliminated.

The reaction of the aminocyclohexylaminoanthraquinone compounds (III) with the 2,4-dihalogenotriazines (IV) substituted in the 6-position is carried out in an aqueous or aqueous-organic medium at temperatures of −10° to 80° and preferably at 10°–50°, and at pH values of 5–12 and preferably 7–11, in the presence of alkaline agents, such as aqueous alkali metal hydroxide, alkali metal carbonate or alkali metal phosphate solutions.

The condensation reaction of the aminocyclohexylaminoanthraquinone compounds of the formula (III) with cyanuric chloride or cyanuric bromide is carried out in an aqueous or aqueous-organic medium at temperatures of 0°–50° and preferably 0°–30° and at pH values of 5–11 and preferably 7–10, and the condensation reaction of the dihalogenotriazinylanthraquinone compounds (V) with the compounds of the formula (VI) is carried out at temperatures of 0°–80° and preferably 10°–60° and at pH values of 4–11 and preferably 5–9, in the presence of the above mentioned alkaline condensing agents.

The new dyestuffs are extremely valuable products which are suitable for very diverse applications. As water-soluble compounds, they are preferentially of interest for dyeing textile materials containing hydroxyl groups and textile materials containing nitrogen, especially textile materials made of natural and regenerated cellulose and also those made of wool, silk and synthetic polyamide fibres and polyurethane fibres.

The said materials are dyed or printed by the processes customary for reactive dyestuffs. Brilliant blue dyeings and prints which are fast to light and fast to wet processing are obtained.

The temperatures quoted in the examples are in °C. The formulae of the dyestuffs in the description and in the examples are those of the free acids. The dyestuffs are generally isolated and employed in the form of their alkali metal salts, especially in the form of the sodium or potassium salts.

EXAMPLE 1

A. 9.9 g of 2-aminobenzene-1,4-disulphonic acid are dissolved in 30 ml of water at 20° by adding about 20 ml of 2 N sodium carbonate solution. After adjusting the pH value to 5.5, 7.2 g of cyanuric chloride are added and the pH value is kept at 5.0–5.5 whilst stirring vigorously. When the reaction has ended, after about 2 hours, the resulting solution is clarified.

B. 16.9 g of 1-amino-4-(4'-amino-cyclohexylamino)-anthraquinone-2,6-disulphonic acid are dissolved in 80 ml of water at pH 9 with about 2.3 ml of 40% strength sodium hydroxide solution. The solution, prepared above, of the reactive component is allowed to run dropwise at a uniform rate in the course of 20 minutes into this dyestuff solution and the pH value of the reaction solution is kept at 8.5–9.0 using 2 N sodium hydroxide solution. When the condensation reaction has ended, after stirring for several hours more, 20% potassium chloride is gradually added to the dyestuff solution. The dyestuff of the formula

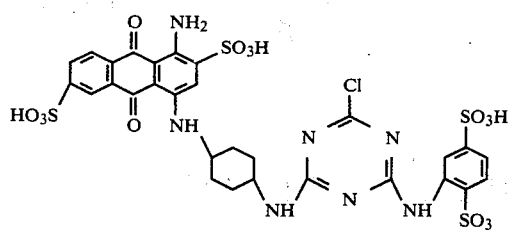

which has precipitated is filtered off, washed with 25% strength potassium chloride solution and dried in vacuo at 50°.

C. Cellulose fabric is printed with a printing paste which contains, per kilogram, 40 g of the above dyestuff, 100 g of urea, 300 ml of water, 500 g of alginate thickener and 20 g of sodium carbonate and has been made up to 1 kilogram with water. The fabric is then dried, steamed for 2 minutes at 105°, rinsed with hot water and then soaped at the boil. After rinsing and drying, a brilliant, blue print with very good fastness to light and wet processing is obtained.

For dyeing by the padding process, 100 g of cotton fabric are padded at room temperature with an aqueous solution which contains 30 g/liter of dyestuff, 20 g/liter of sodium carbonate and 150 g/liter of urea, subjected to intermediate drying, heated for 2 minutes at 140° and then rinsed and soaped at the boil. The fabric is dyed in brilliant blue shades which are fast to light and wet processing. Instead of heating to 140°, the padded fabric can also be steamed for 8 minutes at 102°–105°.

EXAMPLE 2

A. 8.3 g of cyanuric chloride are dissolved in 50 ml of acetone and precipitated as a suspension by pouring the solution onto 50 g of ice. A solution of 7.8 g of 4-aminobenzenesulphonic acid in 60 ml of water, the pH of which has been adjusted to 5, is now allowed to run dropwise into the cyanuric chloride suspension at 0°–5° and during this addition the pH value is kept at 4.5–5.0 using 2 N sodium carbonate solution. The reaction mixture is stirred for about 30 minutes more, until the condensation reaction has ended.

B. The resulting solution is allowed to run, in the course for 30 minutes, into a solution, which is at 20°–25°, of 19.1 g of 1-amino-4-(4'-amino-cyclohexylamino)-anthraquinone-2,7-disulphonic acid, the pH of which has been adjusted to 9.5, and the pH value of the reaction mixture is kept at 8.8–9.2 using 2 N sodium hydroxide solution. After stirring for several hours more at 20°–25°, the condensation reaction is brought to completion. The resulting dyestuff of the formula

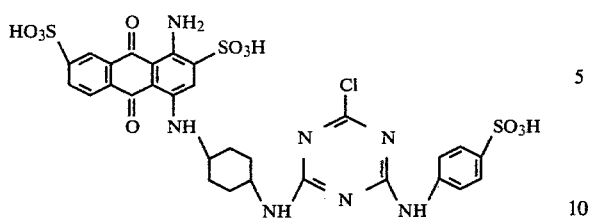
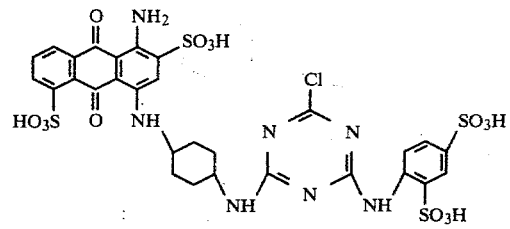

is salted out with 15% potassium chloride, the precipitate is filtered off and the filter cake is washed with 15% potassium chloride solution. The material on the filter is dried at 50° in vacuo.

Using the processes of Example 1, the dyestuff gives brilliant blue prints and dyeings on cellulose fabric and these display very good fastness to light and wet processing.

C. For dyeing from a long liquor, 50 g of a cotton hank are dyed in 1 liter of dye liquor which contains 1.5 g of the above dyestuff, by heating to 80° in the course of 30 minutes, adding 100 g of sodium sulphate in several portions, then adding 20 g of sodium carbonate and treating at the said temperature for 60 minutes. After rinsing, soaping at the boil and drying, a brilliant blue dyeing with excellent fastness to light and wet processing, in particular including the fastness to chlorine, is obtained.

EXAMPLE 3

A. 9.0 g of cyanuric chloride are dissolved in 50 ml of acetone. The solution is poured onto 50 g of ice and a solution of 12.3 g of 4-aminobenzene-1,3-disulphonic acid, the pH of which has been adjusted to 5, is allowed to run into the resulting suspension at 0°–5°. The pH value of the reaction mixture is kept at 4.5–5.5 using 2 N sodium carbonate solution and the condensation reaction is brought to completion by stirring for a further 3 hours.

B. 20.5 g of 1-amino-4-(4'-amino-cyclohexylamino)-anthraquinone-2,5-disulphonic acid are suspended in 400 ml of water and dissolved by adding 4 N sodium hydroxide solution until the pH value is 9.5. The solution of the reactive component prepared above is allowed to run into the solution at 20°–25° and the pH value is kept at 9.0–9.3 using 2 N sodium hydroxide solution. The reaction mixture is stirred for several hours more, until the condensation reaction has ended. The dyestuff is salted out by saturating the solution with sodium chloride and is filtered off, washed with saturated sodium chloride solution and dried in vacuo at 50°. The dyestuff has the formula and on cotton or viscose staple gives brilliant blue prints with very good fastness properties.

EXAMPLE 4

If, in Example 2, the 4-aminobenzenesulphonic acid and the 1-amino-4-(4'-amino-cyclohexylamino)-anthraquinone-2,7-disulphonic acid are replaced by equivalent amounts of 3-aminobenzenesulphonic acid and 1-amino-4-(4'-amino-cyclohexylamino)-anthraquinone-2,6-disulphonic acid, a dyestuff of the formula

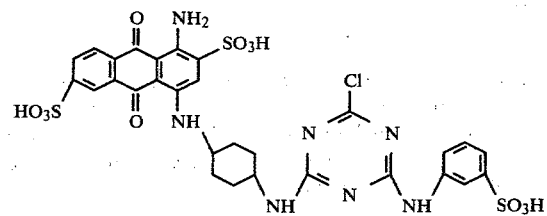

is obtained, which is very similar to the dyestuff of Example 2 in respect of the coloristic properties.

The same dyestuff can be obtained if the anthraquinone component is first subjected to a condensation reaction with cyanuric chloride at pH 8.5–8.7 and 0°–5° and the dichlorotriazinylanthraquinone dyestuff is then reacted with 3-aminobenzenesulphonic acid at 35°.

EXAMPLE 5

A. 10.0 g of cyanuric chloride are dissolved in 50 ml of acetone and the solution is added to 50 g of ice. A solution of 6.7 g of 2-aminoethanesulphonic acid, the pH of which has been adjusted to 6.5, is allowed to run dropwise in the course of 15 minutes, at 0°–5°, into the resulting cyanuric chloride suspension and the pH value of the reaction mixture is kept at 6.4–6.7 using 2 N sodium carbonate solution. The reaction mixture is stirred at 0°–5° in the indicated pH range for about a further 1½ hours. A clear solution has then formed.

B. 22.0 g of 1-amino-4-(4'-amino-cyclohexylamino)-anthraquinone-2,7-disulphonic acid are dissolved in 330 ml of water at pH 9.5 and 35°. The solution, prepared above, of the sodium salt of dichlorotriazinylaminoethanesulphonic acid is allowed to run dropwise in the course of 2½ hours into the solution of the dyestuff component. During the addition, the pH value is kept at 9.3–9.5 using 2 N sodium hydroxide solution and the temperature is maintained at 35°. The reaction is brought to completion by stirring for several hours more under these conditions and this is checked by monitoring by chromatography. The resulting dyestuff of the formula

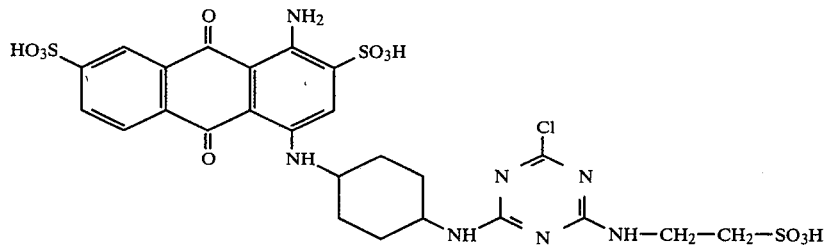

is salted out at 20° using 20% potassium chloride and is filtered off, washed with 20% strength potassium chloride solution and dried at 60° in a circulating air cabinet.

The same dyestuff is obtained if 1-amino-4-(4'-amino-cyclohexylamino)-anthraquinone-2,7-disulphonic acid if first subjected to a condensation reaction with cyanuric chloride at pH 8.5–8.7 and 0°–5° and the resulting intermediate product is then reacted with 2-amino-ethanesulphonic acid at 35°.

The dyestuff gives clear, blue prints on cellulose fabric.

EXAMPLE 6

If, in Example 5, the 1-amino-4-(4'-amino-cyclohexylamino)-anthraquinone-2,7-disulphonic acid is replaced by an equivalent amount of 1-amino-4-(4'-amino-cyclohexylamino)-anthraquinone-2,6-disulphonic acid, a dyestuff of the formula justed to 7, is allowed to run dropwise in the course of 15 minutes, at 0°–5°, into the cyanuric chloride suspension and the pH value is kept at 6.8–7.0 using 2 N sodium carbonate solution. After the dropwise addition, the reaction mixture is stirred for about 45 minutes more under the indicated conditions. A clear solution has formed.

B. 21.0 g of 1-amino-4-(4'-amino-cyclohexylamino)-anthraquinone-2,6-disulphonic acid are dissolved in 300 ml of water at pH 9 and 35°. The solution, prepared above, of the reactive component is allowed to run dropwise in the course of 40 minutes into this solution, at 35°, and the pH value is kept at 8.5–8.7 using 2 N sodium hydroxide solution. The reaction mixture is stirred for several hours more, until a sample taken for chromatography indicates complete conversion of the anthraquinone component. The dyestuff is now salted out with 22% potassium chloride, filtered off, washed with 20% strength potassium chloride solution and dried in vacuo at 50°.

It has the formula

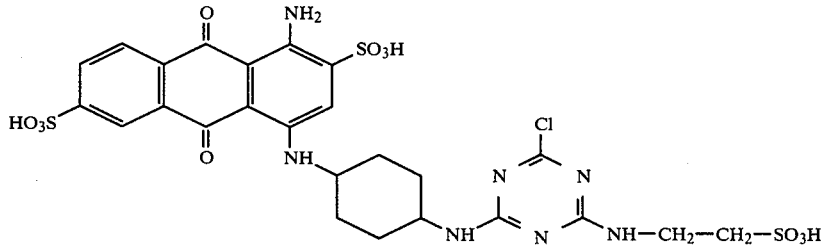

is obtained, which is very similar to the dyestuff of Example 5 in respect of its coloristic properties and, when applied by the printing process of Example 1 C,

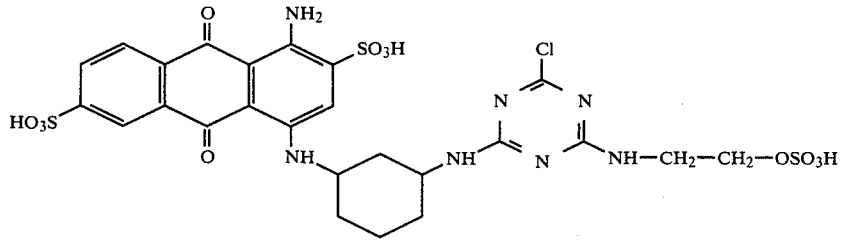

gives clear blue prints which are fast to light and wet processing.

EXAMPLE 7

A. 9.4 g of cyanuric chloride are dissolved in 50 ml of acetone. The solution is added to 50 g of ice, and a solution of 7.0 g of sulphuric acid mono-(2-aminoethyl) ester in 70 ml of water, the pH of which has been adand on cotton gives clear blue prints which are very fast to light and wet processing.

Further reactive dyestuffs, which give brilliant blue prints or dyeings on cellulose fibres, are obtained analogously to the preceding examples when the anthraquinone compounds and 2,4-dichlorotriazines, substituted in the 6-position, listed in Table I are subjected to a condensation reaction.

TABLE I
| No. | Anthraquinone component | Reactive component |
|---|---|---|
| 8 | 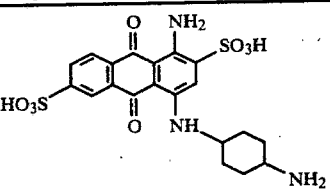 | 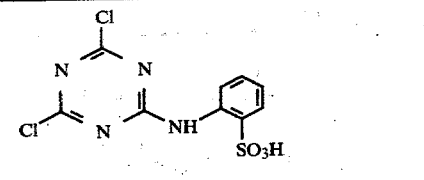 |
| 9 | 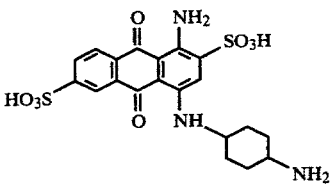 | 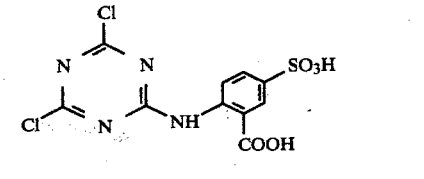 |
| 10 | 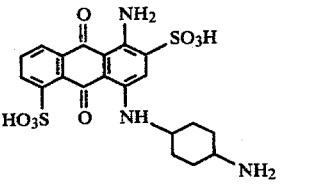 | 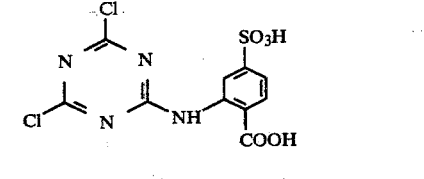 |
| 11 | 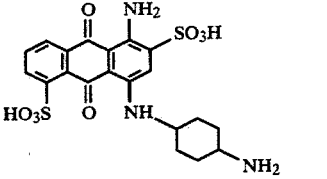 | 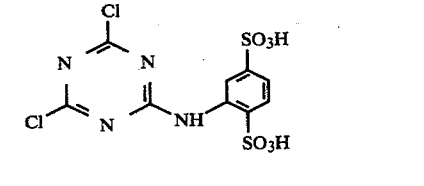 |
| 12 | 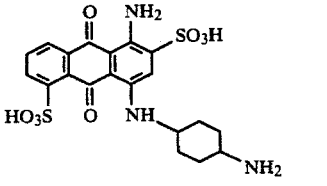 | 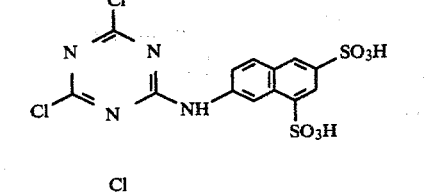 |
| 13 | 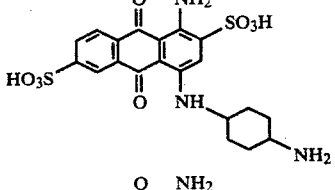 | 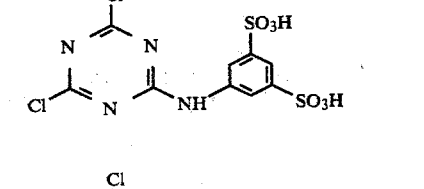 |
| 14 | 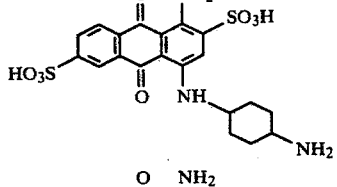 | 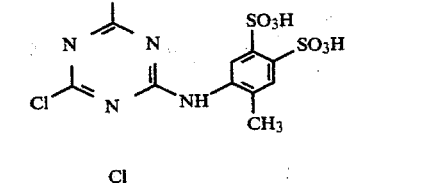 |
| 15 | 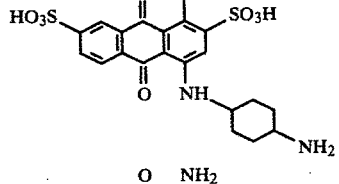 | 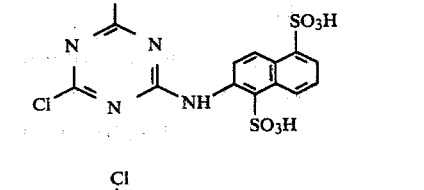 |
| 16 | 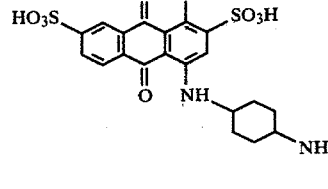 | 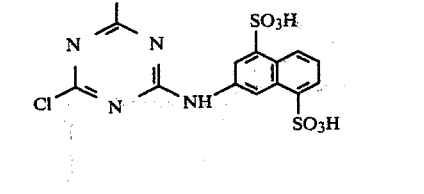 |

| | TABLE I-continued | |
|---|---|---|
| No. | Anthraquinone component | Reactive component |
| 17 | 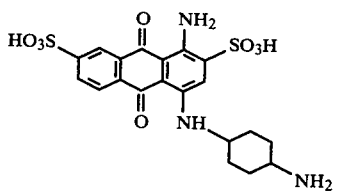 | 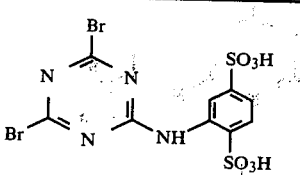 |
| 18 |  | 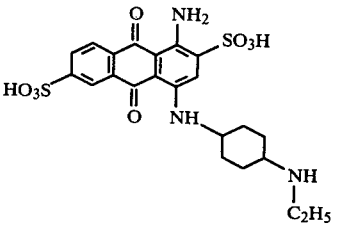 |
| 19 | 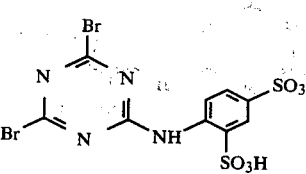 |  |
| 20 | 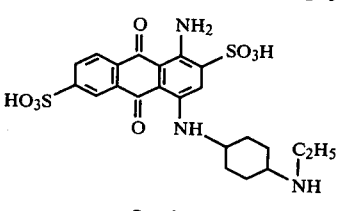 | 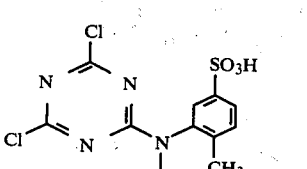 |
| 21 |  | 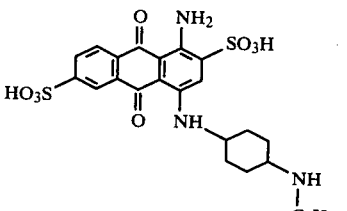 |
| 22 | 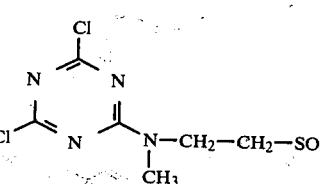 |  |
| 23 | 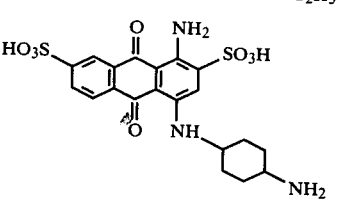 | 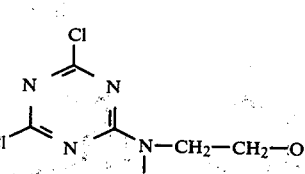 |
| 24 |  | 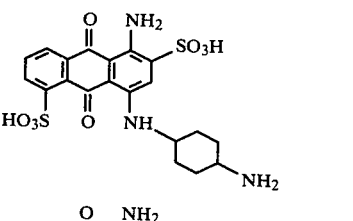 |

TABLE I-continued
| No. | Anthraquinone component | Reactive component |
|---|---|---|
| 25 | 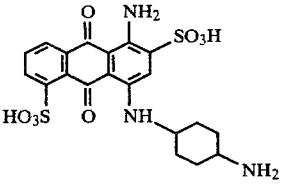 | 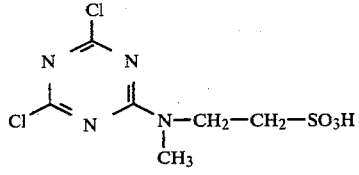 |
| 26 | 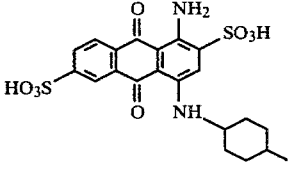 | 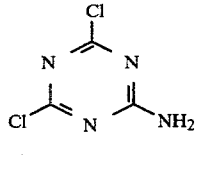 |
| 27 | 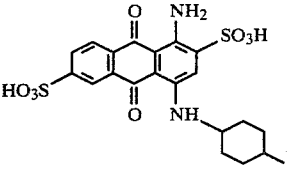 | 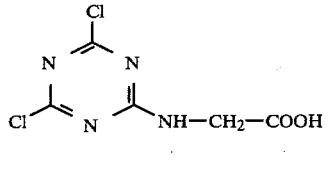 |
| 28 | 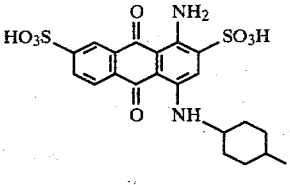 | 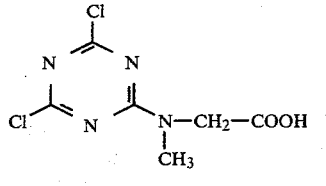 |
| 29 | 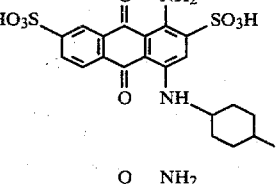 | 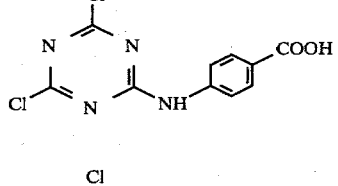 |
| 30 | 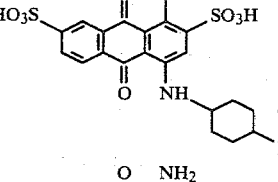 | 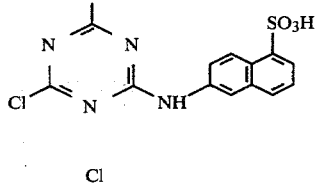 |
| 31 | 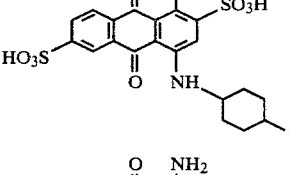 | 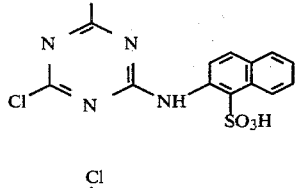 |
| 32 | 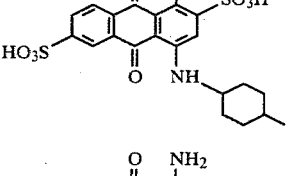 | 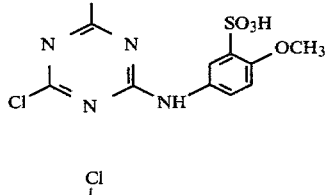 |
| 33 | 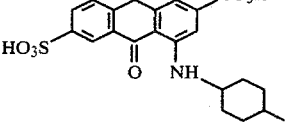 | 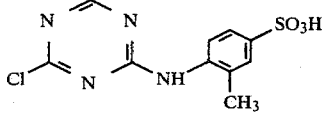 |

TABLE I-continued

| No. | Anthraquinone component | Reactive component |
|---|---|---|
| 34 | HO₃S—[anthraquinone with O, NH₂, SO₃H, O, NH—cyclohexyl—NH₂] | [dichlorotriazine]—NH—[phenyl with OCH₃ and SO₃H] |
| 35 | HO₃S—[anthraquinone with O, NH₂, SO₃H, O, NH—cyclohexyl—NH₂] | [dichlorotriazine]—NH—[phenyl with Cl and SO₃H] |
| 36 | HO₃S—[anthraquinone with O, NH₂, SO₃H, O, NH—cyclohexyl—NH₂] | [dichlorotriazine]—N(CH₃)—CH₂—CH₂—SO₃H |

EXAMPLE 37

A. 7.4 g of cyanuric chloride are dissolved in 30 ml of acetone. The solution is added to 30 g of ice and a solution of 5.0 g of 2-aminoethanesulphonic acid in 30 ml of water, the pH of which has been adjusted to 6.5–7, is allowed to run in dropwise in the course of 20 minutes at 0°–5°. During the addition, the pH value is kept at 6.5–6.7 using 2 N sodium carbonate solution. The reaction mixture is stirred for about a further 1 hour under the indicated conditions. The cyanuric chloride has been converted and a clear solution has formed.

B. 14.2 g of 1-amino-4-(4'-amino-cyclohexylamino)anthraquinone-2-sulphonic acid are dissolved in 200 ml of water at 60° by adding 12 ml of 4 N sodium hydroxide solution.

This solution and the prepared solution of the reactive component are allowed to run dropwise, at the same time, into 80 ml of water at 40°, which has been initially introduced, at a rate such that the resulting pH value in the mixture is 9.3–9.5. After the dropwise addition of the dyestuff component, this pH range is further maintained by the dropwise addition of 2 N sodium hydroxide solution. The reaction mixture is stirred for several hours more until the condensation reaction has ended. The resulting dyestuff of the formula

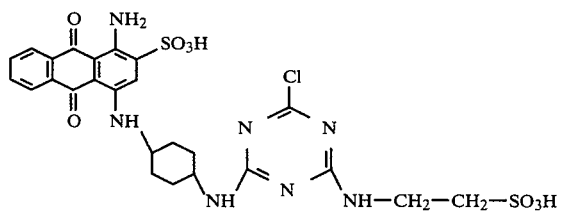

is salted out with sodium chloride, filtered off, washed with 10% strength sodium chloride solution and dried in vacuo at 50°.

When applied by the process of Example 1 C, it gives clear, blue prints with very good fastness properties on cotton and viscose staple.

EXAMPLE 38

A. 5.5 g of cyanuric chloride are dissolved in 40 ml of acetone. The solution is poured onto 40 g of ice, and a solution of 13.4 g of 1-amino-4-(4'-amino-cyclohexylamino)-anthraquinone-2,5-disulphonic acid in 300 ml of water, the pH of which has been adjusted to 10, is allowed to run dropwise in the course of 30 minutes into the cyanuric chloride suspension at 0°–5°. During the addition, the pH value is kept at 8.0–8.5 using 2 N sodium carbonate solution. The reaction mixture is stirred for about a further 2 hours; the condensation reaction has then ended. The mixture is warmed to 20°–25°.

B. A solution of 2.6 g of 3-aminobenzenesulphonic acid and 2.6 g of 4-aminobenzenesulphonic acid in 50 ml of water, the pH of which has been adjusted to 6–7, is then allowed to run in dropwise and the temperature is then raised to 35°. During this step in the procedure, the pH value is kept at 7.5–8.0 using 2 N sodium hydroxide solution. The condensation reaction between the dichlorotriazinylanthraquinone compound and the aminobenzenesulphonic acids is brought to completion by stirring for several hours more at 35°. The resulting dyestuff of the formula

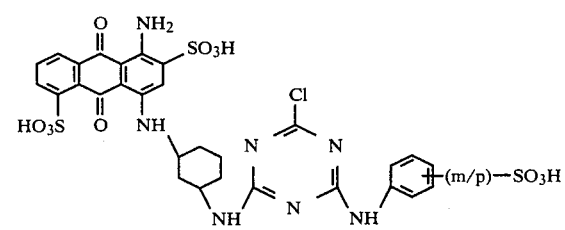

is salted out with 15% potassium chloride, washed and dried in vacuo at 50°.

EXAMPLE 39

A. 11.6 g of cyanuric chloride are dissolved in 60 ml of acetone. The solution is added to 60 g of ice, and a solution of 28.0 g of 1-amino-4-(4'-amino-cyclohexylamino)-anthraquinone-2,6-disulphonic acid in 180 ml of water, the pH of which has been adjusted to 9, is now allowed to run in the course of 45 minutes into the cyanuric chloride suspension, at 0°–5°. During the addition, the pH value of the reaction mixture is kept at 8.5–9.0 using 2 N sodium hydroxide solution. After the dropwise addition, the reaction mixture is stirred for about a further 2 hours at 0°–5°.

B. After the reaction has ended, 6.8 g of N-methylaniline are added to the resulting solution and the temperature is raised to 35°. The pH value continues to be maintained at 8.0–8.5. After about 30–60 minutes, the condensation reaction between the dichlorotriazinylanthraquinone component and N-methylaniline has ended. 80 ml of 25% strength sodium chloride solution are allowed to run in slowly dropwise and the dyestuff which has precipitated is filtered off, washed with 10% strength sodium chloride solution and dried in vacuo at 50°. The dyestuff has the formula

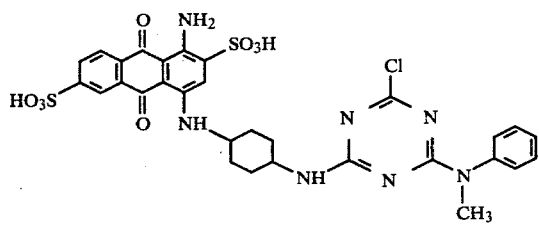

When applied by the process of Example 1 to cotton, it gives clear, blue dyeings and prints which are very fast to light and wet processing.

EXAMPLE 40.

A. 18.0 g of cyanuric chloride are dissolved in 90 ml of acetone. The solution is added to 90 g of ice, and a solution of 39.9 g of 1-amino-4-(4'-aminocyclohexylamino)-anthraquinone-2-sulphonic acid in 690 ml of water and 51.0 ml of 2 N sodium hydroxide solution is allowed to run dropwise into the suspension, at 0°–5°, at a rate such that the resulting pH value in the reaction mixture is 8.0–8.5. After the dropwise addition, this pH value is further maintained using 2 N sodium hydroxide solution and the reaction mixture is stirred for about a further 2 hours, until the condensation reaction has ended.

B. The solution of the dichlorotriazinylanthraquinone component is now warmed to 20° and the pH value is adjusted to 7.5. A solution of 12.3 g of methylaminomethanesulphonic acid in 45 ml of water, the pH of which has been adjusted to 6.5, is added, the mixture is warmed to 35° and the pH value is kept at 7.0–7.5 by the dropwise addition of 2 N sodium hydroxide solution. When the condensation reaction has ended, the solution is evaporated to dryness in a rotary evaporator, or the dyestuff solution is subjected to spray-drying. The resulting powder contains the dyestuff of the formula

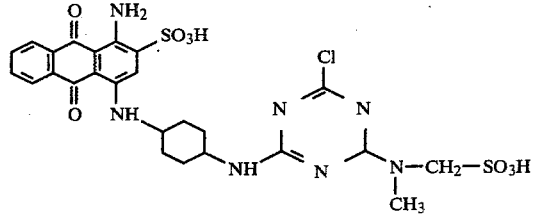

When applied to cellulose fabric by the process of Example 1, the dyestuff gives clear blue prints and dyeings which are fast to light and wet processing.

EXAMPLE 41

A. Analogously to the procedure described in Example 39, 5.8 g of cyanuric chloride are subjected to a condensation reaction with 14.1 g of 1-amino-4-(4'-amino-cyclohexylamino)-anthraquinone-2,7-disulphonic acid at 0°–5° and pH 8.0–8.5.

B. 4.0 g of methylaminomethanesulphonic acid are dissolved in 40 ml of water at pH 6. This solution is allowed to run, in the course of 20 minutes, into the solution of the dichlorotriazinylanthraquinone compound, which is kept at 35°, and a pH value of 7.0–7.5 is maintained in the reaction mixture. The reaction mixture is stirred for a further 1½ hours and the solution is then evaporated in a rotary evaporator under 12 mm Hg. The residual blue powder contains the dyestuff of the formula

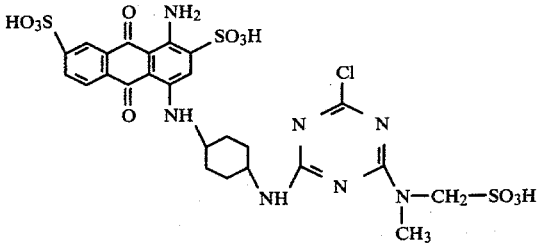

Using this dyestuff, clear blue prints and dyeings with excellent fastness properties are obtained on cellulose fabric.

Further reactive dyestuffs are obtained analogously when the anthraquinone compounds listed in Table II are subjected to a condensation reaction with cyanuric chloride and the resulting dichlorotriazinylanthraquinone compounds are reacted with the amine components indicated in column 3 of the table, in a molar ratio of 1:1. On cellulose fabric, the resulting reactive dyestuffs give brilliant-blue prints and dyeings which are fast to light and wet processing.

TABLE II

| No. | Anthraquinone component | Amine component |
|---|---|---|
| 42 | ![structure] | $NH_2-CH_2-CH_2-OSO_3H$ |

TABLE II-continued

| No. | Anthraquinone component | Amine component |
|---|---|---|
| 43 | 1-NH₂, 2-SO₃H, 4-NH-(4-aminocyclohexyl), 7-SO₃H anthraquinone | 2-methyl-3-amino-benzenesulfonic acid (H₃C-, NH₂, SO₃H) |
| 44 | 1-NH₂, 2-SO₃H, 4-NH-(4-aminocyclohexyl), 5-SO₃H anthraquinone | CH₃—NH—CH₂—COOH |
| 45 | 1-NH₂, 2-SO₃H, 4-NH-(4-aminocyclohexyl), 7-SO₃H anthraquinone | 3-aminobenzenesulfonic acid |
| 46 | 1-NH₂, 2-SO₃H, 4-NH-(4-aminocyclohexyl), 7-SO₃H anthraquinone | CH₃—NH—CH₂—CH₂—OSO₃H |
| 47 | 1-NH₂, 2-SO₃H, 4-NH-(4-aminocyclohexyl), 8-SO₃H anthraquinone | 2-methylaniline |
| 48 | 1-NH₂, 2-SO₃H, 4-NH-(4-aminocyclohexyl), 7-SO₃H anthraquinone | aniline |
| 49 | 1-NH₂, 2-SO₃H, 4-NH-(4-aminocyclohexyl), 7-SO₃H anthraquinone | 4-amino-benzyl-sulfonic acid |
| 50 | 1-NH₂, 2-SO₃H, 4-NH-(4-aminocyclohexyl), 7-SO₃H anthraquinone | 3-amino-benzenesulfonamide N-(2-hydroxyethyl) |
| 51 | 1-NH₂, 2-SO₃H, 4-NH-(4-aminocyclohexyl), 7-SO₃H anthraquinone | 2-methoxyaniline |

TABLE II-continued

| No. | Anthraquinone component | Amine component |
|---|---|---|
| 52 | 1-amino-4-(4-aminocyclohexylamino)-2,6-disulfo anthraquinone | aniline (C₆H₅NH₂) |
| 53 | 1-amino-4-(4-aminocyclohexylamino)-2,7-disulfo anthraquinone | anthranilic acid (2-H₂N-C₆H₄-COOH) |
| 54 | 1-amino-4-(4-aminocyclohexylamino)-2-sulfo anthraquinone | HN(CH₂—COOH)₂ |
| 55 | 1-amino-4-(4-aminocyclohexylamino)-2-sulfo anthraquinone | CH₃NH—CH₂—CH₂—OSO₃H |
| 56 | 1-amino-4-(4-aminocyclohexylamino)-2-sulfo anthraquinone | CH₃—NH—CH₂—CH₂—SO₃H |
| 57 | 1-amino-4-(4-aminocyclohexylamino)-2-sulfo anthraquinone | HN(CH₂—CH₂—SO₃H)₂ |
| 58 | 1-amino-4-(4-aminocyclohexylamino)-2,7-disulfo anthraquinone | NH₃ |
| 59 | 1-amino-4-[4-(2-hydroxyethylamino)cyclohexylamino]-2,5-disulfo anthraquinone | 4-aminobenzenesulfonic acid |

TABLE II-continued

| No. | Anthraquinone component | Amine component |
|---|---|---|
| 60 | (structure) | (structure) |
| 61 | (structure) | (structure) |
| 62 | (structure) | (structure) |
| 63 | (structure) | (structure) |
| 64 | (structure) | (structure) |

EXAMPLE 65

A. 5.8 g of cyanuric chloride are dissolved in 30 ml of acetone and the solution is added to 30 g of ice. A solution of 14.1 g of 1-amino-4-(4'-amino-cyclohexylamino)-anthraquinone-2,7-disulphonic acid in 200 ml of water, the pH of which has been adjusted to 9, is allowed to run into the cyanuric chloride suspension in the course of 30 minutes, at 0°–5°, and the pH value is kept at 8.0–8.5 using 2 N sodium hydroxide solution. After about 2 hours, the condensation reaction between cyanuric chloride and the dyestuff component has ended. The solution is warned to 20°.

B. 1.7 g of ammonium chloride are dissolved in 20 ml of water and the solution is added to the dichlorotriazinyl compound. The reaction mixture is warmed to 45° and the pH value is further maintained at 8.5–9.0. After the condensation reaction has ended, the dyestuff of the formula

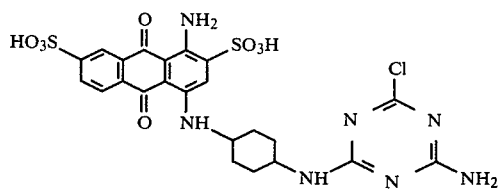

is salted out with 15% NaCl, the precipitate is filtered off and the filter cake is washed with 15% strength sodium chloride solution and dried in vacuo at 50°. On cellulose fabric, the dyestuff gives clear blue prints and dyeings with excellent fastness properties.

We claim:

1. A dyestuff of the formula

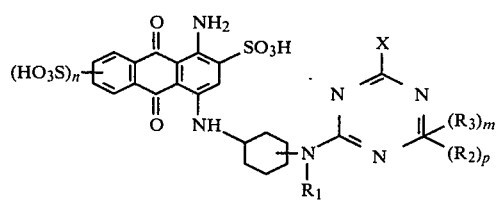

wherein
n is 0 or 1,
m and p are 0 or 1 and m+p=1.
X is Cl or Br,
$R_1$ is H or $C_1$–$C_4$-alkyl optionally substituted by —OH, —OSO$_3$H, —COOH or —SO$_3$H,
$R_2$ is NH$_2$ or alkylamino, dialkylamino or aralkylamino which contains at least one SO$_3$H, OSO$_3$H or COOH group, and
$R_3$ is the same as $R_2$ or is optionally substituted arylamino and when n is 0, p is 1 and when n is 1, m is 1.

2. A dyestuff according to claim 1 of the formula

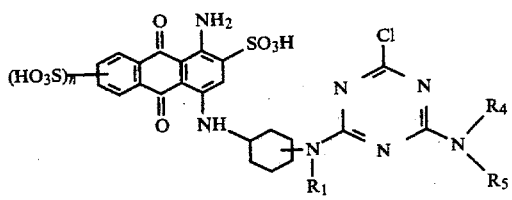

wherein $R_1$ is H or $C_1$–$C_4$-alkyl, $R_4$ and $R_5$ are H or $C_1$–$C_4$-alkyl, and at least one of the alkyl radicals $R_4$ or $R_5$ must carry a $SO_3H$, $OSO_3H$ or COOH group, and n is 0 or 1.

3. Use of the dyestuffs of claim 1 for dyeing and printing fibre materials containing hydroxyl groups and fibre materials containing amide groups.

4. Fibre materials printed and dyed with the dyestuffs of claim 1.

5. A dyestuff selected from the group consisting of

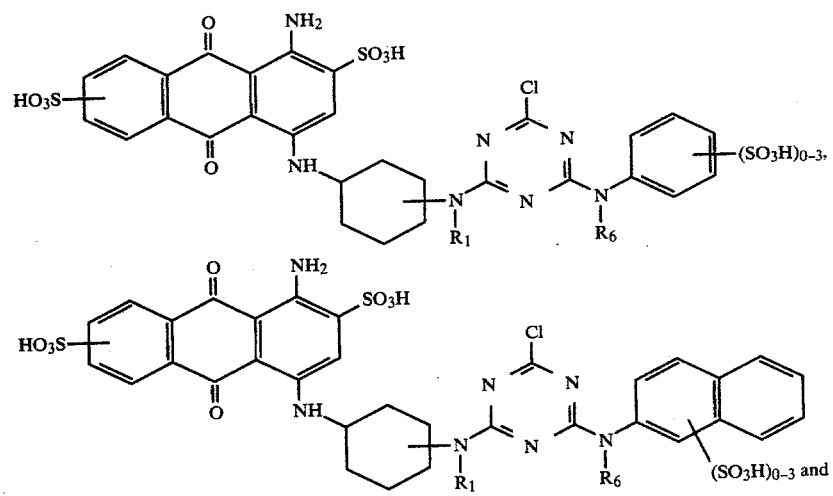

wherein each of $R_1$ and $R_6$ is H or $C_1$–$C_4$-alkyl.

6. A dyestuff according to claim 5, selected from the group consisting of

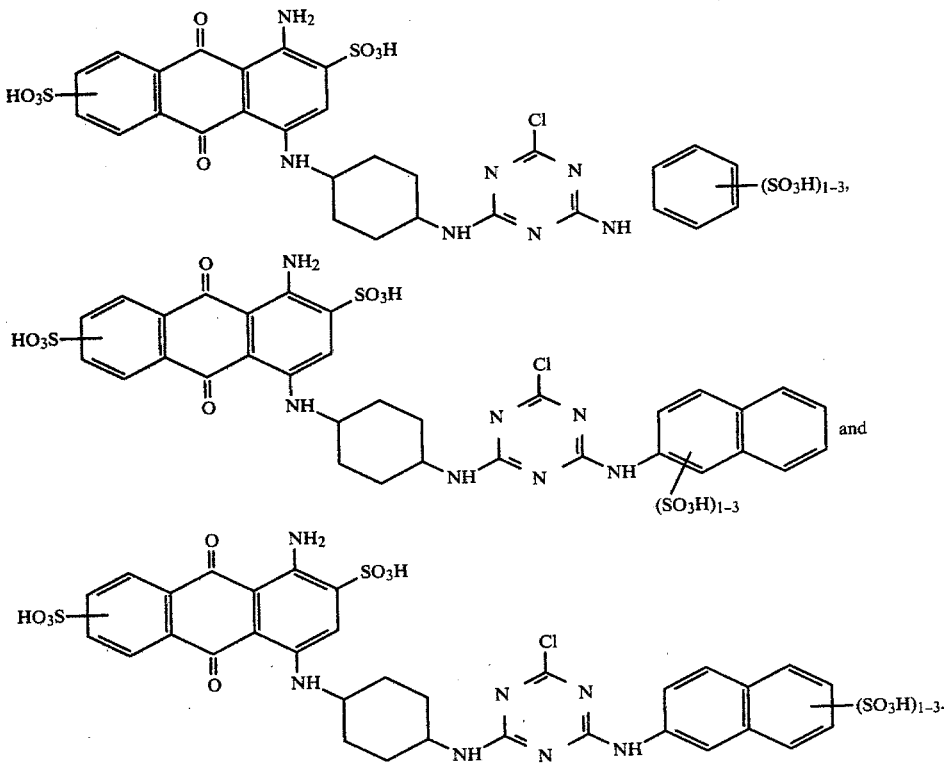

* * * * *